United States Patent
Reicks

(10) Patent No.: US 10,012,498 B2
(45) Date of Patent: Jul. 3, 2018

(54) CONVEYOR IDLER ANGULAR ALIGNMENT MEASUREMENT DEVICE

(71) Applicant: Allen V. Reicks, Pella, IA (US)

(72) Inventor: Allen V. Reicks, Pella, IA (US)

( * ) Notice: Subject to any disclaimer, the term of this patent is extended or adjusted under 35 U.S.C. 154(b) by 137 days.

(21) Appl. No.: 15/076,176

(22) Filed: Mar. 21, 2016

(65) Prior Publication Data

US 2017/0248414 A1    Aug. 31, 2017

Related U.S. Application Data

(60) Provisional application No. 62/301,114, filed on Feb. 29, 2016.

(51) Int. Cl.
  *G01B 11/27*   (2006.01)
  *G01B 11/14*   (2006.01)

(52) U.S. Cl.
  CPC ............. *G01B 11/27* (2013.01); *G01B 11/14* (2013.01); *G01B 11/272* (2013.01)

(58) Field of Classification Search
  CPC ........ G01B 11/27; G01B 11/272; G01B 11/14
  USPC ......... 33/227, 228, 286, 370, 371, 412, 451, 33/533, 645, DIG. 1, DIG. 21; 198/502, 198/502.1
  See application file for complete search history.

(56) References Cited

U.S. PATENT DOCUMENTS

| | | | | |
|---|---|---|---|---|
| 3,664,489 A | | 5/1972 | Krauss et al. | |
| 3,956,632 A | * | 5/1976 | Hall | ........................ G01D 5/341 198/810.03 |
| 4,249,294 A | * | 2/1981 | Belfiore | ................ G01B 11/27 29/271 |
| 5,987,762 A | * | 11/1999 | Toth | ........................ G01B 11/27 33/227 |
| 6,031,616 A | * | 2/2000 | Seiffert | ................... G01B 11/27 356/399 |
| 6,098,297 A | * | 8/2000 | Belfiore | ................ G01B 11/27 33/286 |
| 6,434,841 B1 | * | 8/2002 | Stahl | .................... G01B 11/272 33/286 |
| 6,628,378 B1 | * | 9/2003 | Marangoni | ............ G01B 11/27 33/286 |

(Continued)

FOREIGN PATENT DOCUMENTS

WO     199508094     3/1995

OTHER PUBLICATIONS

Precision Idler Hanger Laser Alignment, CLX-635T by Applied Resolution Technologies, Publication date: Sep. 9, 2015.

*Primary Examiner* — R. A. Smith
*Assistant Examiner* — Tania Courson
(74) *Attorney, Agent, or Firm* — Sturm & Fix LLP

(57) ABSTRACT

A method and apparatus is disclosed for providing an indication of the perpendicularity of a conveyor belt idler with respect to a reference line known to be parallel to a direction of movement of a conveyor belt when the conveyor belt is disposed on the conveyor belt idler. An idler roller attachment structure is provided to be temporarily attached to a first idler roller having a first rotational axis. An elongated member is rotatably and axially moveably operatively attached to the idler roller attachment structure along a reference axis of rotation which is parallel to the first rotational axis. A laser, having a laser beam, is operatively attached to the elongated member, the laser beam being perpendicular to the reference axis of rotation.

18 Claims, 19 Drawing Sheets

(56) References Cited

U.S. PATENT DOCUMENTS

| | | | | |
|---|---|---|---|---|
| 6,704,115 B1* | 3/2004 | Hamar | ............... | G01B 11/272 |
| | | | | 356/622 |
| 6,889,441 B2* | 5/2005 | Seiffert | ............... | G01B 11/27 |
| | | | | 33/286 |
| 6,931,738 B2* | 8/2005 | Bodgren | ............... | F02B 67/06 |
| | | | | 33/286 |
| 6,988,610 B2* | 1/2006 | Fromme | ............... | B65G 43/02 |
| | | | | 198/502.1 |
| 8,037,615 B2* | 10/2011 | Glaser | ............... | G01B 21/045 |
| | | | | 33/286 |
| 8,250,770 B2* | 8/2012 | Diefenderfer | ......... | F16H 57/022 |
| | | | | 33/286 |
| D675,117 S * | 1/2013 | Diefenderfer | ............... | D10/69 |
| 8,416,411 B2* | 4/2013 | Ileogben | ............... | F16H 9/14 |
| | | | | 33/286 |
| 9,207,071 B2* | 12/2015 | Diefenderfer | ......... | G01B 11/272 |
| 9,285,215 B2* | 3/2016 | Olszewski | ........... | G01B 11/272 |
| 2010/0258411 A1* | 10/2010 | Thomas | ............. | B65G 21/2072 |
| | | | | 198/866 |

* cited by examiner

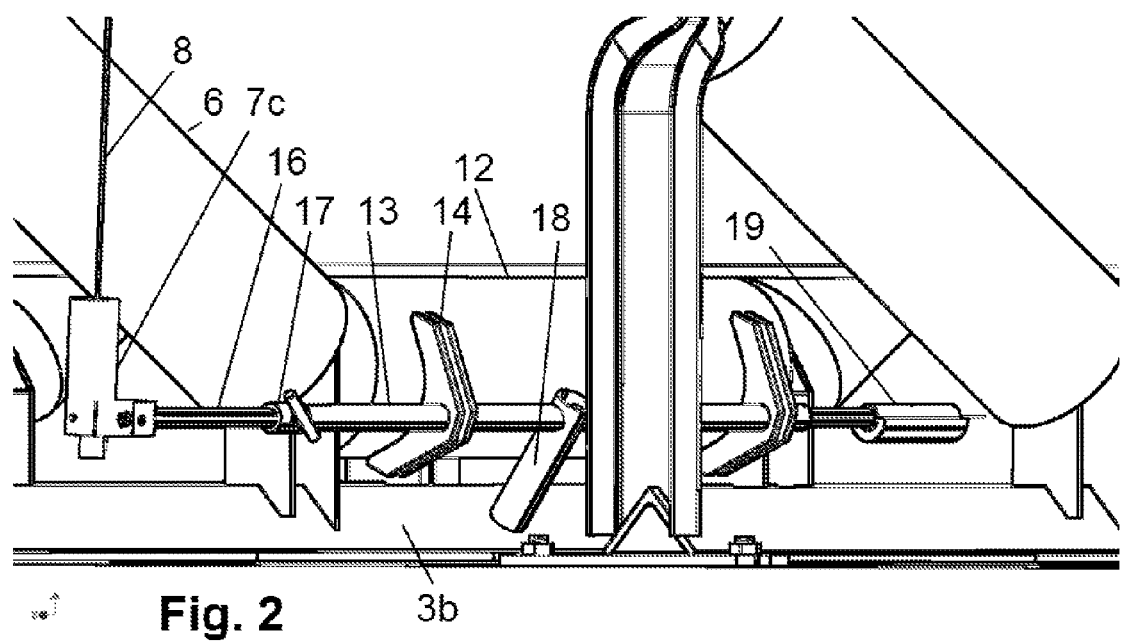

CONVEYOR IDLER ANGULAR ALIGNMENT MEASUREMENT DEVICE

RELATED APPLICATION

Priority is hereby claimed to U.S. Provisional Patent No. 62/301,114 to Reicks, filed Feb. 29, 2016 to a Conveyor Idler Angular Alignment Measurement Device, which describes the construction and use of the present invention and is hereby incorporated herein by reference in its entirety.

TECHNICAL FIELD

This invention relates generally to conveyors and a method and apparatus for single handedly giving a visual and quantitative indication of the perpendicularity of each belt conveyor idler to the belt of a conveyor.

BACKGROUND

Testing has shown imprecise idler angular alignment is often a significant source of power loss on a conveyor as well as contributing to the wear and tracking instability of belt conveyors. When an idler roll is not perpendicular to the belt direction of travel, the belt/idler roll condition commonly referred to as "sliding parallel to the roll axis" develops. This continual sliding is resisted by an axial force. This force has lateral and longitudinal components. The longitudinal component resists belt movement, which condition requires additional power. The lateral force component causes roll and belt wear due to the belt undesirably wandering along its designated path. Alignment is focused on the center roll of a three roll idler set since the center roll has the most load and therefore exerts the greatest axial friction force. Minimizing this force is the purpose of the present invention.

The most common current measurement methods to prevent the aforementioned problem is to use a tape measure in various imprecise ways or, even worse, rely on visual references to support stringers. Positioning a tape measure is usually a two person job and requires two cross measurements for angular deviation measurements. Measuring to adjacent idlers is not the most relevant point of reference since both idlers can be misaligned without verifying alignment to the belt. The outer, or wing, idler roll is the most available but does not offer an easy or accurate location on its exposed circumference for measurement. Alternatively, points on the idler frame can be used but access to the same point on adjacent or near idlers is often obstructed. None of these points are as beneficial as a direct measurement to the center roll since alignment of all of the idler rolls to each other and to the frame may not be tightly controlled by manufacturers. The center roll carries the most load and therefore is most resistance to belt movement if not well aligned.

WO1995008094 A1 (incorporated herein by reference in its entirety) by inventor Geoff Edwards is dated 1995 and shows a device apparently used in a product produced by Applied Resolution Technologies (ART), an Australian company, that is used for idler alignment. The ART method uses a laser in a manner to be perpendicular to an idler roll so a common datum is created to allow measurement to common features, such as the roll ends, of nearby idlers. The mounting method and principle of operation of the Edwards/ART measurement device/system is difficult to use and is problematical in accomplishing its desired result.

U.S. Pat. No. 3,664,489 A (also incorporated herein by reference in its entirety) shows an apparatus and method for aligning belt conveyor components such as idler frames and pulleys but is difficult to use.

Accordingly, there is a need for a method and apparatus to overcome the aforementioned problems and disadvantages of the prior art.

SUMMARY OF THE INVENTION

The present invention relates to an apparatus for providing a visual and quantitative indication of the perpendicularity of a conveyor belt idler with respect to a reference line known to be parallel to a direction of movement of a conveyor belt. An idler roller attachment structure is provided to be temporarily attached to a first idler roller having a first rotational axis. An elongated member is rotatably and axially moveably operatively attached to the idler roller attachment structure along a reference axis of rotation which is parallel to the first rotational axis. An indicating component, such as a laser having a laser beam, is operatively attached to the elongated member, the laser beam being perpendicular to the reference axis of rotation.

BRIEF DESCRIPTION OF THE DRAWINGS

FIG. 2 is a perspective view of the preferred embodiment mounted on a conveyor;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
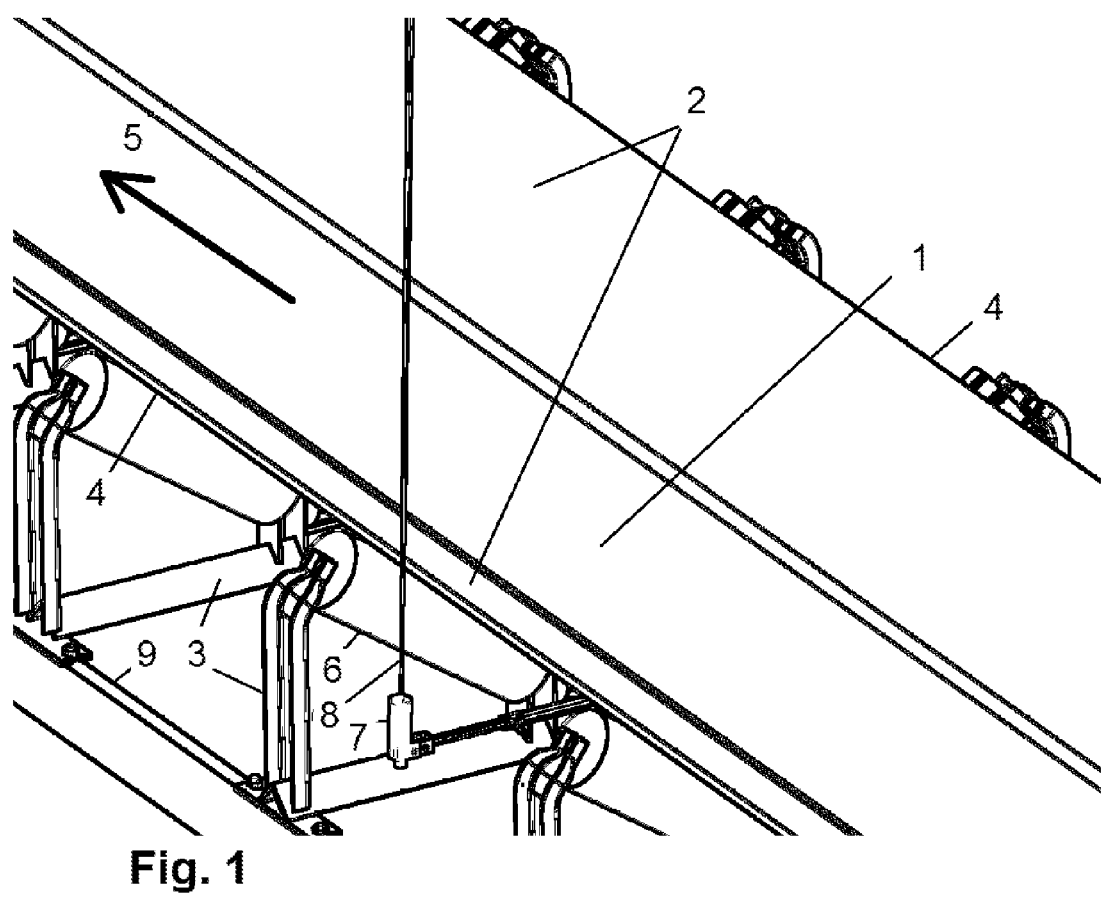
FIG. 1 is a perspective view showing a preferred embodiment of the present invention positioned on an empty belt conveyor, showing also a laser beam emanating from a laser.
Figure 1A:
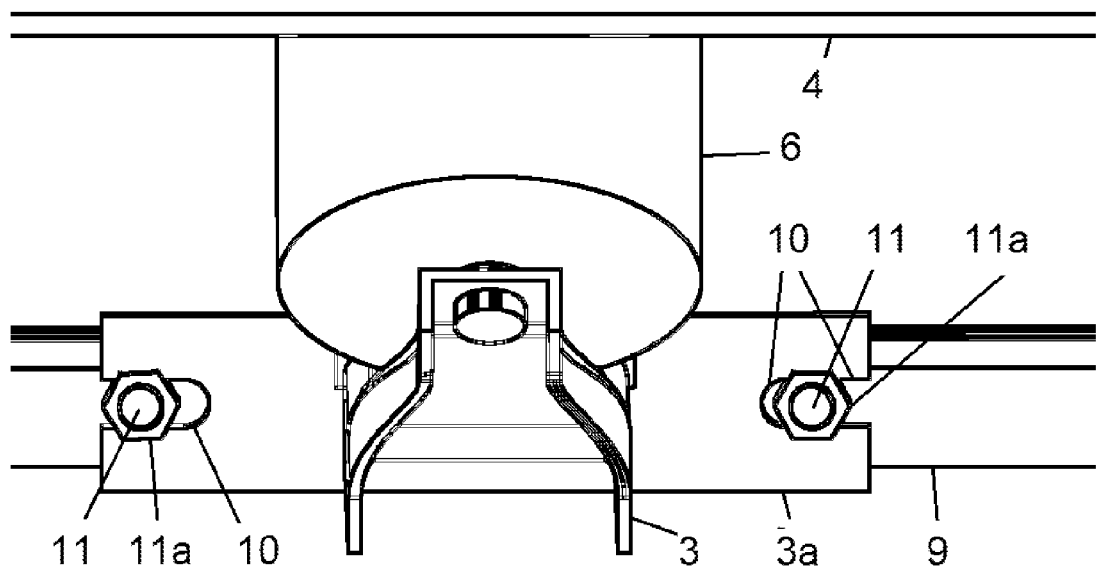
FIG. 1a is an enlarged perspective view of an idler mounting arrangement on a conveyor.

Referring now to the drawing FIGS. 1-8, wherein like reference numerals indicate identical or similar parts throughout the several views, the general location of the preferred embodiment shown in FIG. 1 is shown installed on a belt conveyor. The relevant conveyor construction comprises a continuously long wide and thin belt formed in a generally symmetrically trapezoidal shape including a center portion 1 and two wing portions 2. The belt has two edges 4. When operating, the belt moves in the direction indicated by arrow 5, which is parallel to the belt edges 4. The belt is supported by regularly spaced idler sets each comprised of a stationary framework 3 supporting three rollers 12, 6, 6 which support the belt at the center section 1 and each wing section 2, 2 respectively. Each of the roller's axis is approximately perpendicular to the belt direction 5 though the idler frame construction and its mounting to the supporting structure 9, typically comprised of structural steel members arranged generally parallel to the conveyor direction. FIG. 1a shows the idler framework mounted to the supporting structure 9 where the idler framework includes a footpad 3a as a subcomponent. The footpad 3a lays on the support structure and includes slots 10 for passage of bolts 11 which, with associated nuts 11a, clamp the idler framework 3 to the support structure 9 via holes (not shown) in it. It should be understood that the conveyor is symmetrical about a center vertical plane parallel to the direction of movement 5 so that the same support and clamping construction exists on the idler near the opposite belt edge 4. When the nut and bolt assembly 11, 11a is loosened, the slots 10 allow limited independent movement of each end of the idler parallel to direction of motion 5 so that the idler and therefore its rollers 9,6 may be adjusted angularly, when only one side of the idler is moved, to be perpendicular to the belt movement 5. It is the purpose of this invention to indicate when the rotary axis of one of the rolls, typically the center roll 12, is precisely perpendicular to the belt movement direction 5.

Figure 1B:
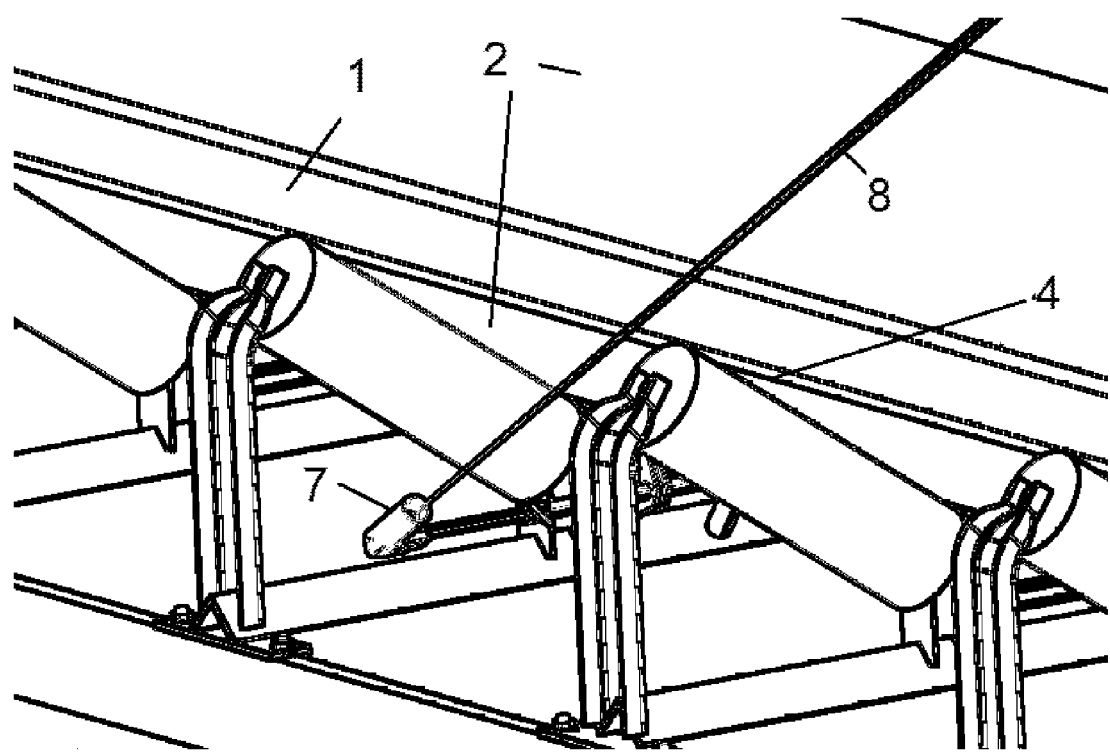
FIG. 1b is a perspective view like FIG. 1 but showing the laser in an alternate position on the conveyor.
Figure 1C:
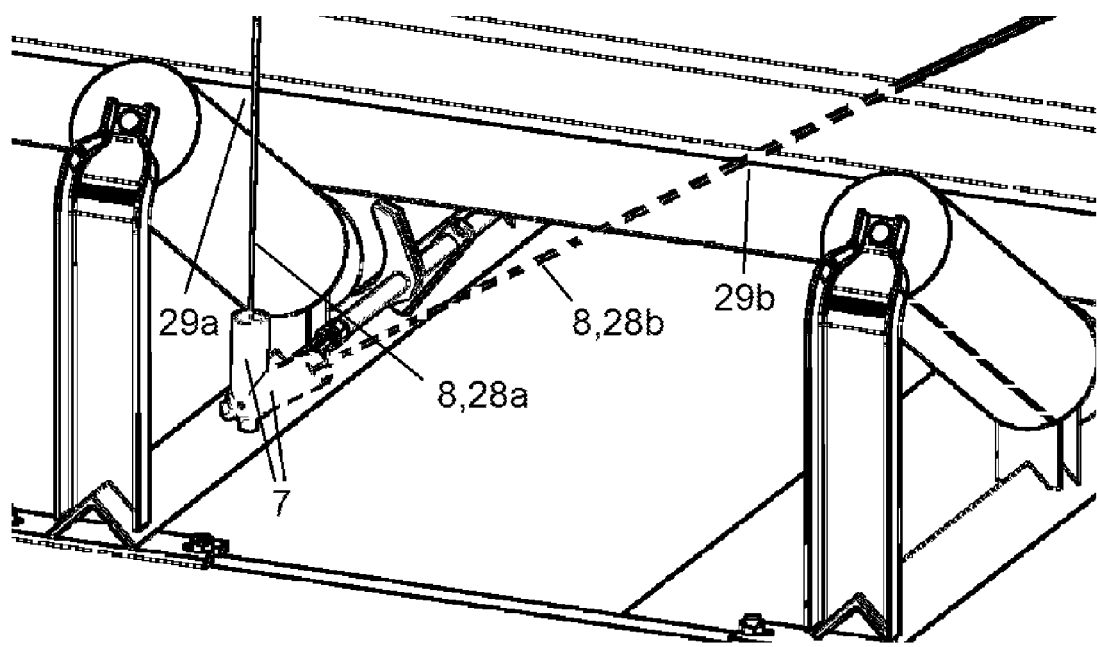
FIG. 1c is a perspective view like FIG. 1b but showing two alternate rotary positions and reference line locations.
Figure 8:
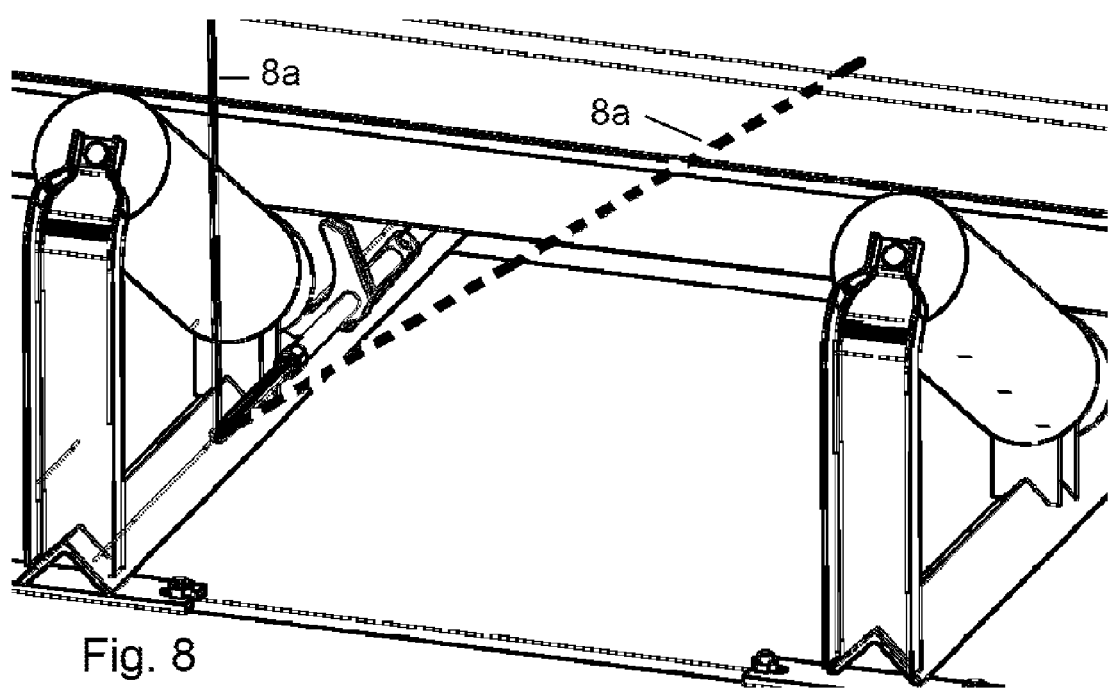
FIG. 8 is a view like FIG. 1c but showing an alternate embodiment with a rigid linear member shown in two alternate rotary positions and reference line locations.

FIG. 1 also shows a laser assembly 7 and its approximately vertical beam 8 which passes by and may be partly or wholly intercepted by the belt wing section 2 and its edge 4. FIG. 1b shows the same laser assembly 7 and beam 8, no longer vertical, redirected to similarly engage the belt and its edge 4 at a position remote from that in FIG. 1. FIG. 1c shows the laser 7 in two (of many possible) rotary positions 28a and 28b at or near two locations 29a and 29b along the belt edge 4. It is to be understood that the laser 8 may be replaced with a straight rod, bar or any form of rigid linear member 8a as shown in FIG. 8 and used the same as the laser beam 8 in the following description.

Figure 2A:
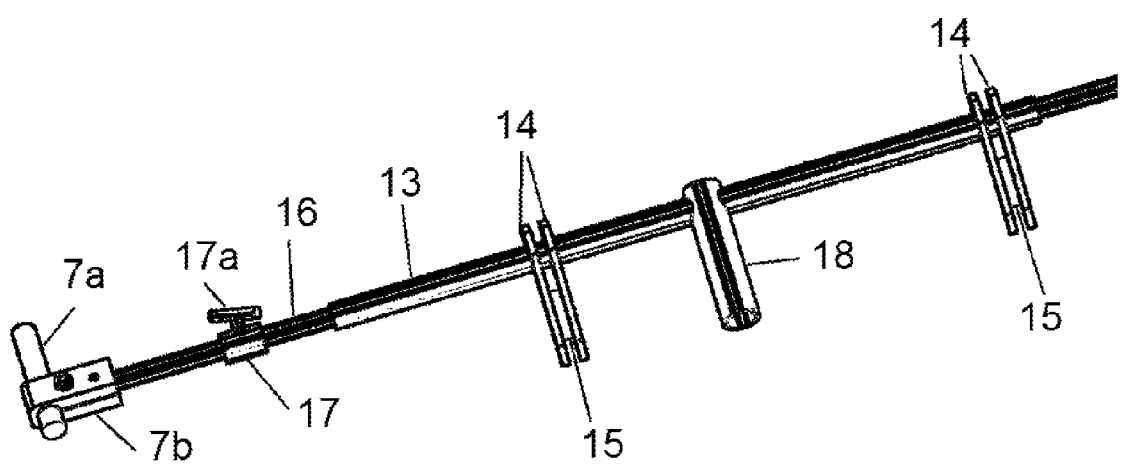
FIG. 2a is a perspective view of the preferred embodiment separated from the conveyor and showing its parts and construction.
Figure 2B:
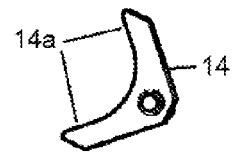
FIG. 2b is an end view of the preferred device of FIG. 2, showing the shape of plates used in mounting the preferred embodiment to idler roll.
Figure 2C:
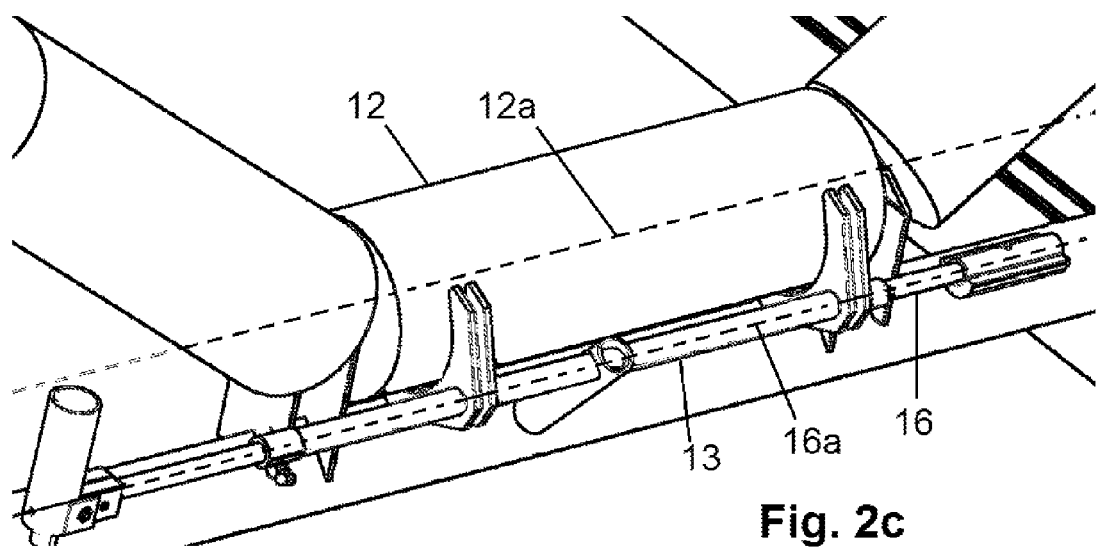
FIG. 2c shows invisible roller and invention centerlines

FIG. 2 shows the preferred embodiment mounted to the center roller 12 of the idler set. It shows the preferred embodiment in use while FIG. 2a better shows the components and their relationship to one another. In the preferred embodiment shown in FIG. 2a and referring to axes in FIG. 2c, the axis 16a of a cylindrically tubular member 13 is established to be parallel to the axis 12a of the center roller 12 of the idler through the use of a two pairs of steel plates 14 with V shaped notches 14a which are welded to the tube 13 in parallel and accurately shifted position to one another so that each point on all of the V surfaces 14a will define a line parallel to the tube centerline for tubes of various diameters. The V surfaces 14a are shown in FIG. 2b. Before assembly and welding, thin rectangular magnets 15 are sandwiched between each pair of plates 14 so that their edges are within the periphery of the plates 14 so as that the magnets 15 two larger surfaces make entire contact.

Still referring to FIG. 2a, a close fitting telescoping and rotating round bar 16 is inserted in the tube 13. An assembly of laser components including a cylindrical laser 7a, a laser bracket 7b and laser guard 7c are mounted to one end of the bar. The bracket 7b clamps to the bar 16 and the laser 7a so as to position and direct the lasers beam 8 radially from the bar 16 centerline 16a. Laser guard 7c (FIG. 2) is attached to the bracket 7b to protect laser 7a from damage from incidental contact. The respective components fit and interaction combine to direct the beam 8 within a plane perpendicular to the roller 12 axis of rotation 16a where the distance between said plane can be adjustably relocated relative to a parallel plane perpendicular to any point on the roller 16 axis. The laser beam 8 in this embodiment has a cross shaped cross section (FIG. 3) made of two short lineal elements bisecting each other at 90 degrees and laser 7 projecting said beam is assembled so that one lineal element is parallel to the line of rotation 16a established by tube 13 and bar 16. It will be understood that the lineal elements creating the cross shaped beam 8 increase in length with increasing distance from the laser 7a creating a divergent beam 8 due to inherent internal working of the laser 7. FIG. 2b shows the axis 12a of the center roll 12 in a parallel orientation to the centerline or axis 16a of the bar 16.

Additional components, as can best be seen in FIGS. 2 and 2a, are an adjustable lock collar 17, a prop 18 and a balance weight 19. The collar 17 is initially moved toward the laser end of the shaft as shown in FIG. 2a until the laser is positioned by rotation about and along the tube 13 and bar 16 centerlines 16a to point at a desired point such as 29a or 29b in FIG. 1c. The collar 17 is then moved along the bar 16 to abut against the tube 13 end as shown in FIG. 2 and then locked to prevent axial movement along the bar 16 by turning the tee handled locking screw 17a. The prop 18 can be rotated on the tube 13. As shown in FIG. 2 it is positioned to prevent the roller 12 from rotating or from the plates 14 from sliding circumferentially on the roller 12 when the preferred embodiment is attached to the roller.

Since it is convenient that the bar 16 not rotate in the tube 13 due to the offset weight provided by the laser assembly 7, collar 19 used to prevent the bar 16 from sliding axially out of tube 13 is unbalanced opposite the imbalance provided by the laser assembly.

Figure 3:
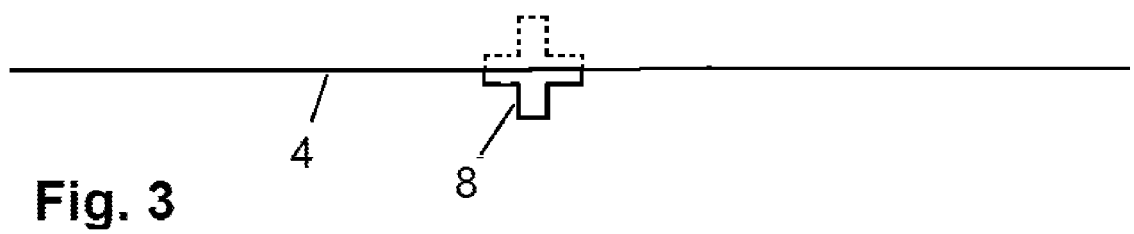
FIG. 3 is a bottom view of the laser beam initially set to intercept an edge of the conveyor belt, the solid lines showing the visual part of the laser beam and the dashed lines showing an invisible part of the laser beam.

FIG. 3 illustrates the portion of the cross shaped laser beam 8 when positioned at a desired location such as 29a of FIG. 1c and as seen from below when the beam is near vertical as in FIG. 1. It will be understood that the laser beam 8 is light and will be seen only when it intercepts a solid object such as the belt. The invisible portion of the beam is shown in dashed lines in FIG. 3. The visible proportion/ percentage of the entire beam 8 cross section as projected on the belt 2 may or may not change as the laser 7 and bar 16 assembly is rotated in the tube 13. If said proportion changes, it is due to a small difference from 90 degrees between the plane swept by rotation of the laser assembly 7 and the vertical plane through the belt edge 4. Whether said proportion increases or decreases with the rotation depends on whether the angle between said plane and axis 12a is greater or less than 90 degrees in the direction of rotation. Such information about perpendicularity of vertical plane containing the belt edge 4 and the center roll 12 axis 12a provides information for optimal realignment of the idler assembly by movement at one end of the idler frame 3 along the slots 10 and thereby changing the angle between the said plane and axis. In addition, if the laser 7 is shifted outward by increasing the distance between the stop 17 and tube 13 end while maintaining a rotary position 28b relative to an initial angular position 28a both creating the beam 8 visibility shown in FIG. 3. Said distance may be measured and used with the distance between locations 29a and 29b along the belt edge 4 during said rotated angle to calculate the existing idler misalignment angle. This misalignment angle is useful to calculate power consumption and for future reference.

Figure 4:
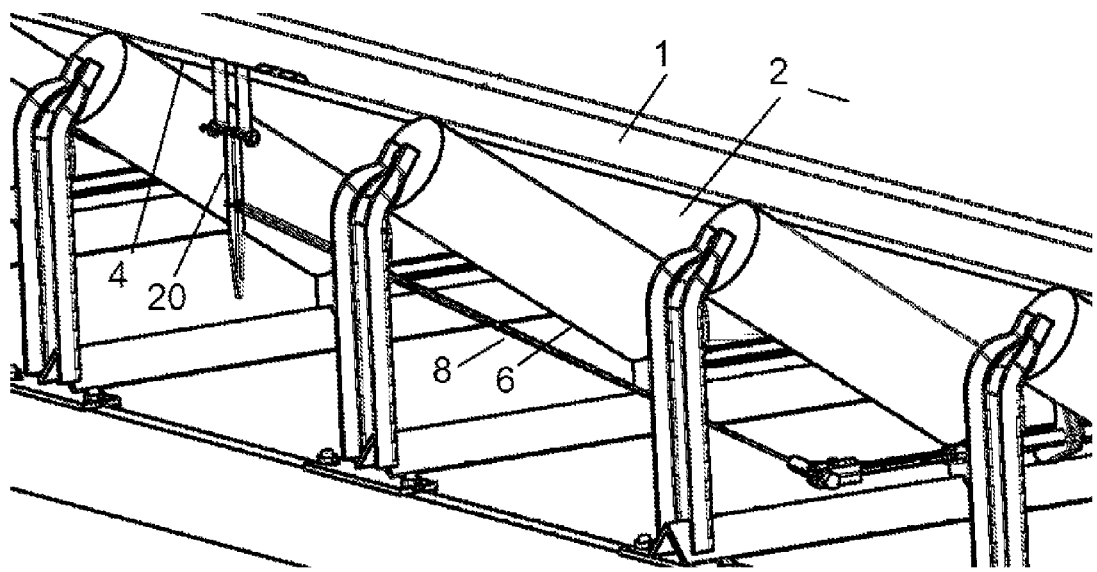
FIG. 4 is a perspective view similar to FIG. 1, but showing the laser beam of the preferred embodiment positioned to detect a target hanging from the belt edge that is at a further distance than the position detected in FIG. 1.
Figure 4A:
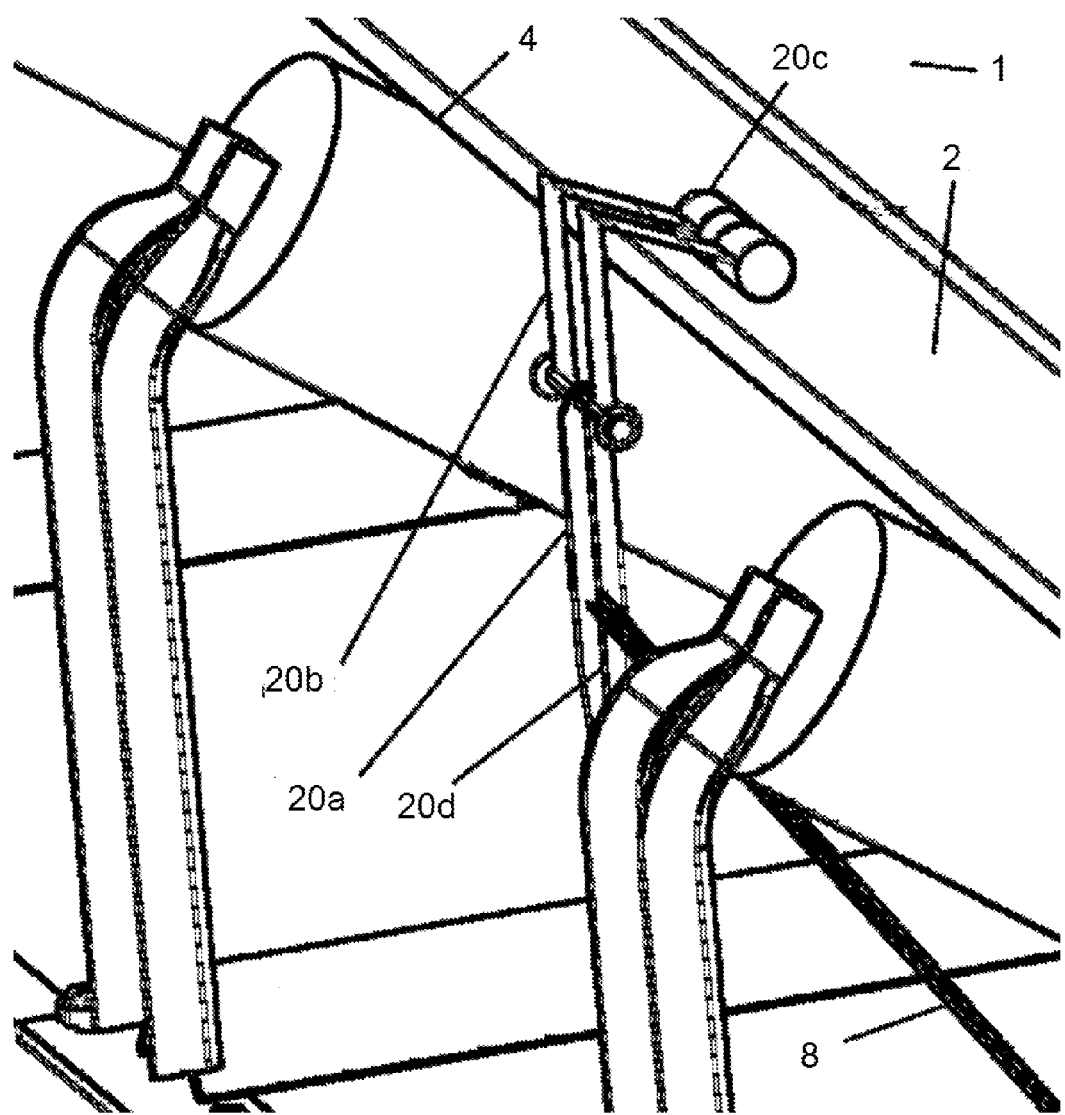
FIG. 4a is an enlarged perspective view of the laser target and beam aligned with belt edge shown in FIG. 4.
Figure 4B:
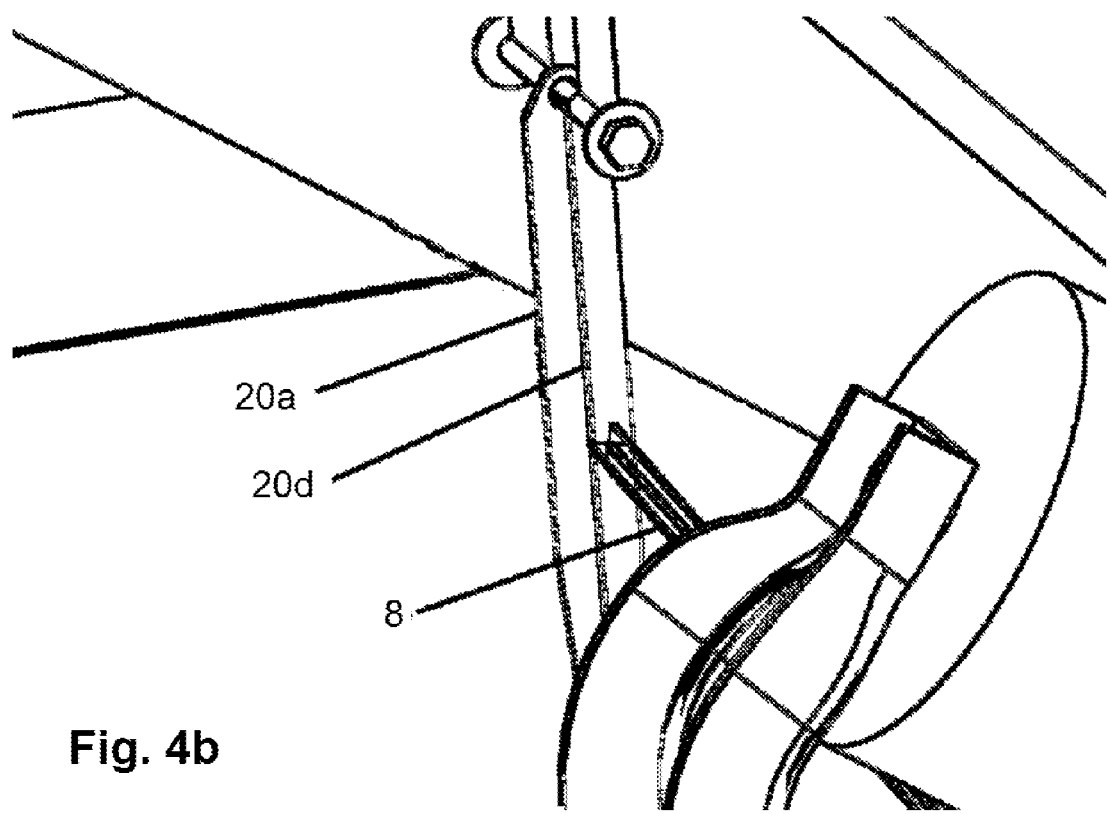
FIG. 4b is an enlarged perspective view showing the beam misaligned with the target.

FIG. 4 shows the preferred embodiment with increased accuracy by increasing the distance along the belt edge 4 that the beam 8 is projected. Increasing that distance allows a smaller misalignment angle to be detected. FIG. 4 shows a target 20 hanging over the belt edge 4 at a distance of two idler spacing intervals. This distance may be more or less but the use of the hanging target 20 prevents the idler wing rollers 6 from intercepting the beam 8 when the laser 7 is rotated to be more horizontal as required to project further distances. FIG. 4a shows the details of construction for the target 20. The flat hanging plumb bob 20a swings on thin flexible straps 20b directly below the belt edge 4. The target assembly 20 is prevented from falling by its weight 20c which rests on the belt section 2. FIG. 4a also shows the cross pattern of the laser beam 8 centered on a scribed centerline 20d which is substantially in line with reference line 4 on the plumb bob 20a. FIG. 4b shows the laser beam 8 off center of the plumb bob 20a as seen by the distance of the vertical element of the beam 8 cross from the centerline 20d. It may be noted that the target 20 may be used on the belt edge 4 on either or both sides of the idler in or opposite the belt direction 5 to more precisely establish an initial position for the laser 7 and its beam 8 by increasing the distance between locations 29a and 29. The difference between FIG. 4a and FIG. 4b illustrates the aligned and misaligned idler cases if the laser beam 8 is initially set to the position shown in FIG. 3.

Figure 5:
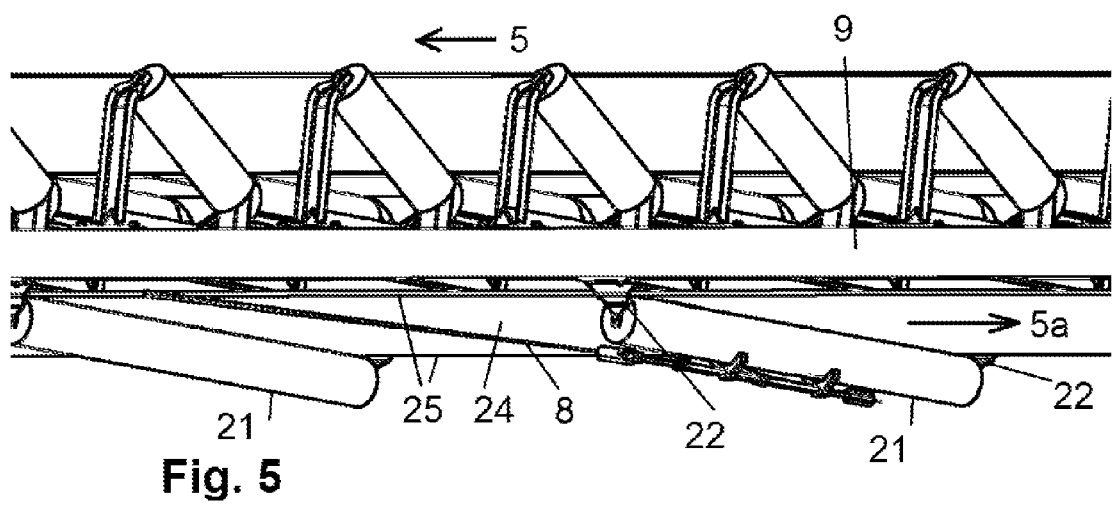
FIG. 5 is a perspective view of the device installed on return side belt under the conveyor.
Figure 5A:
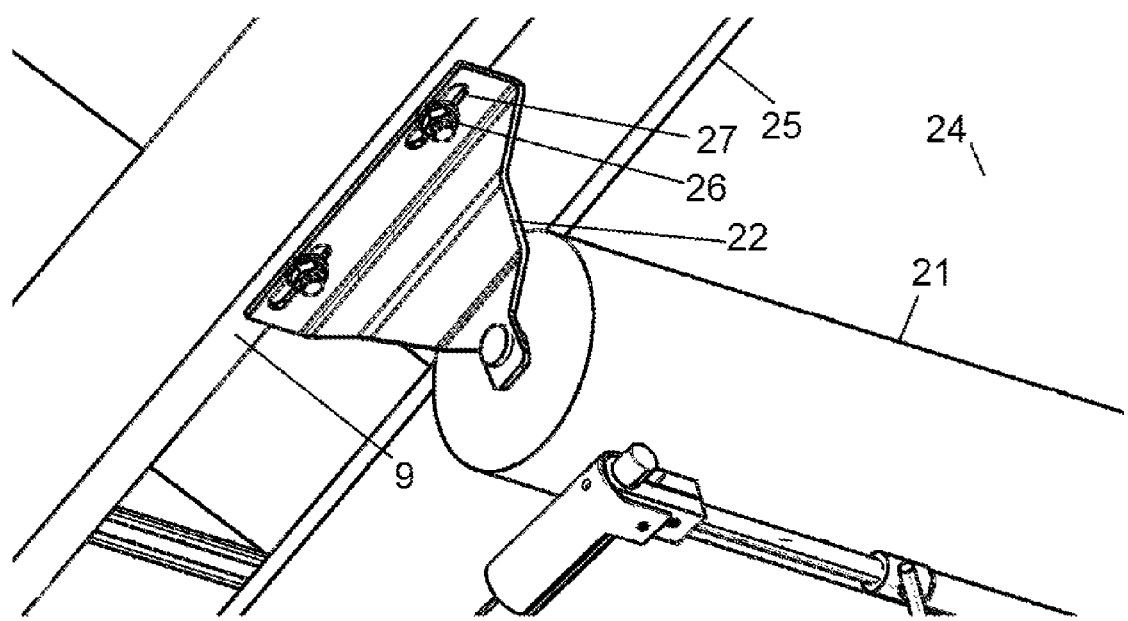
FIG. 5a is an enlarged perspective view of a return idler hangar bracket and slot, showing a placement of the preferred embodiment on the underside of the return idler.

Whereas the belt in a conveyor belts is a continuous loop, and the belt described above moves in direction 5, the same belt is running in the opposite direction 5a under the previous belt 1 as shown in FIG. 5 but is called here the return belt 24. As before, the return belt 24 has edges 25 that are parallel to the movement direction 5a. The return belt 24 may be supported by regularly spaced idler rolls 21 which in turn are supported by brackets 22 bolted to support structure 9 comparable or the same as described previously. The return belt may also be supported by multiple roll sets but the use of the preferred embodiment is similar so is not described here. FIG. 5a shows a close up of the brackets 22 supporting the return belt roll 21. The brackets 22 are again clamped to the support structure with bolts and nuts 26 in slots 27. As with the carrying idler frames 3 (FIG. 1a) and its relationship to its rolls 6, 12 and its slots 10, the slots 27 allow angular adjustment of the return idler 21 axis.

Figure 5B:
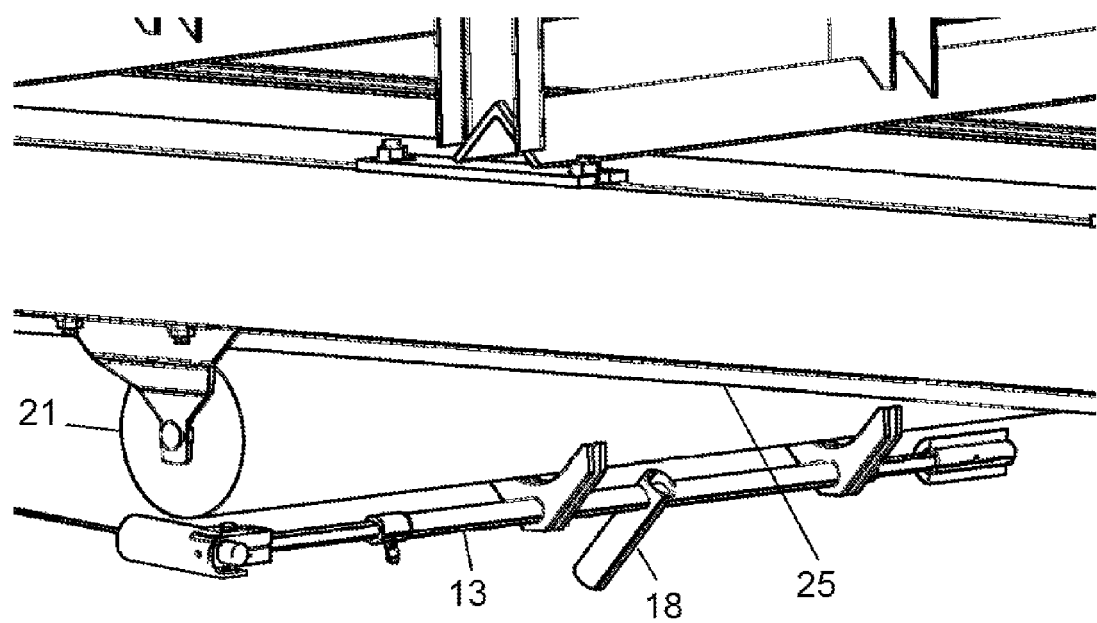
FIG. 5b is a perspective view of the preferred embodiment installed on a return idler.
Figure 5C:
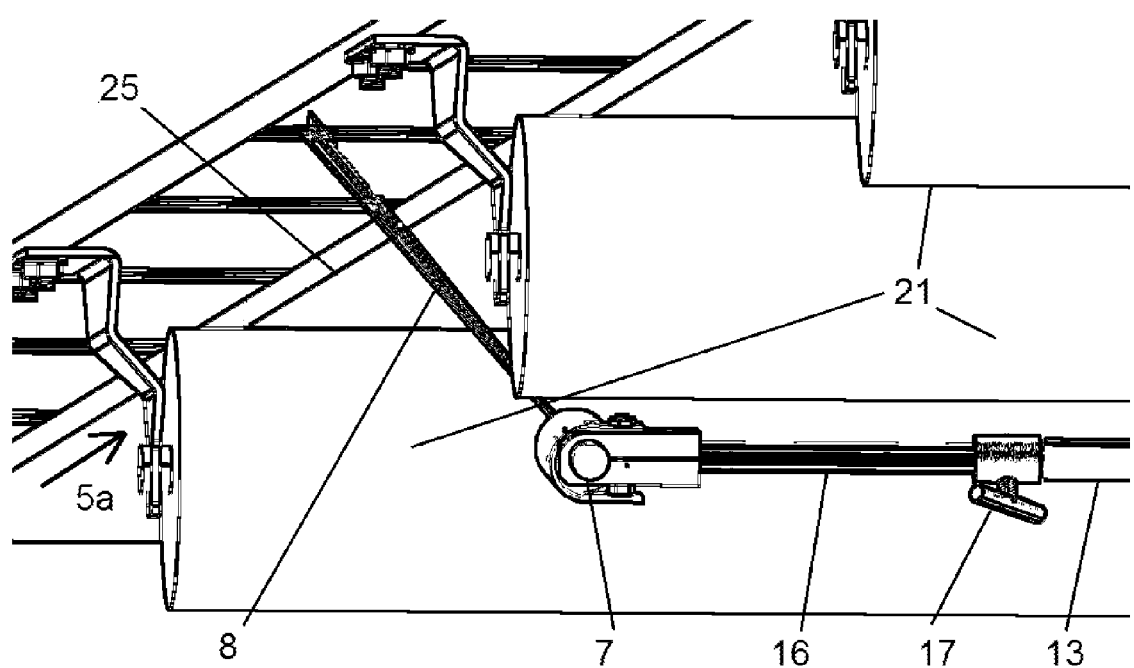
FIG. 5c is an enlarged perspective view of the laser beam intersecting the belt edge.
Figure 5D:
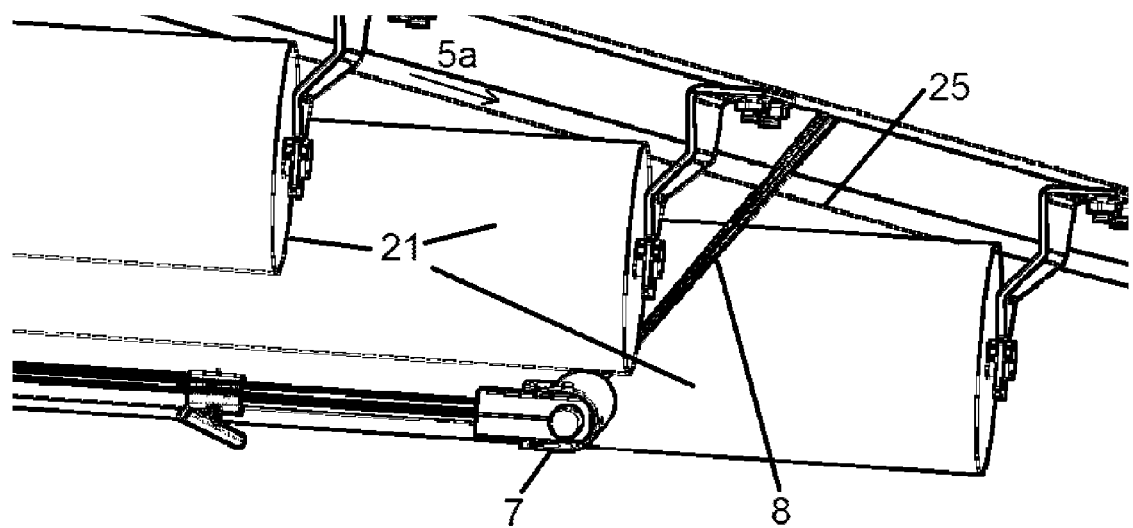
FIG. 5d is an enlarged perspective view of the laser beam intersecting a belt edge on the other side of an idler.

FIG. 5b shows the preferred embodiment hanging from the return idler roll 21 due to the attraction of its magnets 15 again with its tube 13 parallel to the attached roll 21. In this case, the preferred embodiment is positioned to be approximately directly under the roll 21 so the support from the prop 18 is not needed. FIG. 5c is another view of the preferred embodiment hanging from the return idler roll 21. Laser 7 and its beam 8 is shown lined up with belt edge 25, as was seen in FIG. 3, by sliding bar 16 in tube 13. The stop 17 is adjusted to abut the tube 13 establishing an initial position for the belt edge 25 upstream relative to the belt direction 5a. FIG. 5d shows the same preferred embodiment placement on the same roll 21 but with the bar 16 and its attached laser 7 assembly rotated to point downstream of belt movement 5a. Any two rotary positions and locations on 25 as illustrated in 5c or FIG. 5d may be used as 29a, 29b, 29a and 29b to indicated alignment.

The laser beam may or may not be centered per FIG. 3 but in either case provides information as before to improve the perpendicularity of roll 21 to the belt direction 5a by moving one of the brackets 22 in the slots 27. The spacing of idlers 21 are typically wider that with the carry side so using the target 20 for better precision is not as important but nonetheless, may be used as described above.

Figure 6:
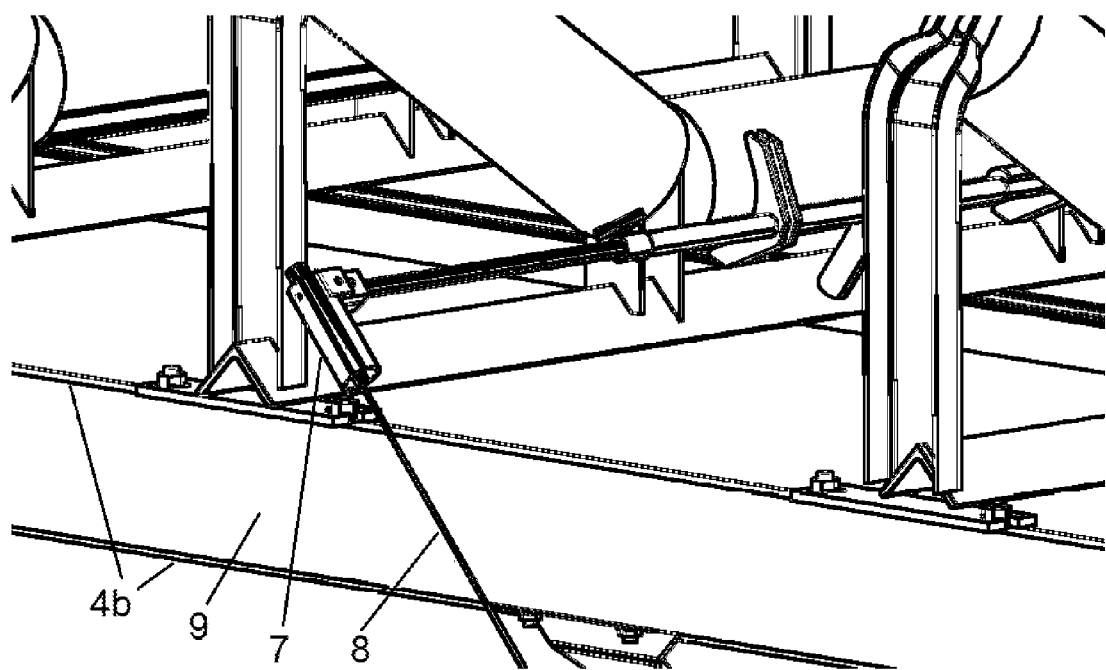
FIG. 6 is a perspective view of the laser oriented to use the conveyor structure itself for the reference line.

FIG. 6 shows the laser 7 and laser beam 8 rotated to used one of the edges of a common version of the conveyor support structure as a reference line 4b instead of the belt edge 4.

Figure 7:
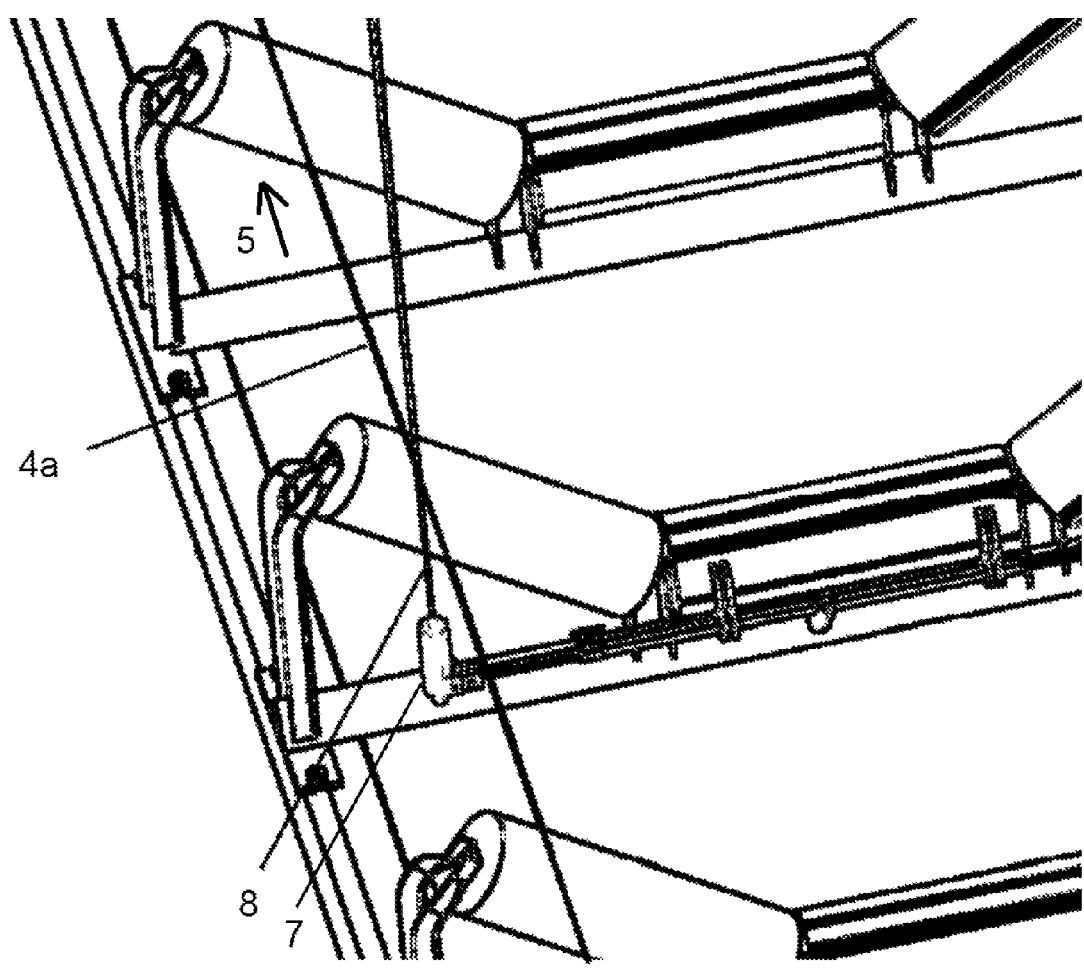
FIG. 7 is a perspective view of the laser with a temporary reference line installed such as a taut wire or secondary laser beam.

FIG. 7 shows use of another alternate to the reference line 4 by installing a tight wire 4a or another laser beam 4a mounted to be parallel to the belt movement direction 5.

Accuracy of assembly shown in FIG. 2 is essential to the purpose of the present invention which will be referred to as an alignment verification rig (AVR). It was developed using precisely cut parts, close telescoping shaft 16 and tube 13 fit, jig alignment of both V plates 14 or pairs of plates to the tube 13 before fixing to each other and precision machined mounting block 7b fixing the laser 7a to the shaft 16 end are important elements to obtaining this accuracy. The length of the tube 16 and spacing of the V plate 14 pairs should be almost as long as the center roll 12 for best tube 13 and shaft 16 parallelism accuracy to the roll axis 12a. Use of a laser 7a constructed to allow fine tuning adjustment allows additional accuracy after assembly of the AVR.

The precisely parallel axial mounting providing purely radial movements of the perpendicular pointer 8 or 8a allowed by the configuration of this device to locate the conveyor belt edge 4 at various points along its length are believed to be novel. This construction allows the use of a less expensive laser. Using magnetic attraction to easily and precisely attach a measurement device to an idler is believed to be novel, though other ways of attaching the device to the idler roller tube such as straps, vacuum, or the like can be used instead. The ease of use and lower cost in addition to allowing attachment with the belt installed are advantages.

The preferred embodiment of the AVR, the details of which are not critical unless they are covered by the broadest appended claims, comprises a tight fitting telescoping combination of a shaft in a tube allowing axial movement and rotation. The tube is fixed to a pair of identical plates or pairs of plates which each have V notches that are aligned parallel to the tube so to engage the outer diameter of an idler roll, usually the center roll. The outer profile of the plates is such that they do not interfere with the horizontal belt contacting the roll at twelve o'clock when located in an approximately three o'clock position.

Those skilled in the art will recognize that a wide variety of modifications, alterations, and combinations can be made with respect to the above described embodiments without departing from the spirit and scope of the preferred embodiment, and that such modifications, alterations, and combinations are to be viewed as being within the ambit of the inventive concept as expressed by the attached claims.

I claim:

1. A method of providing an indication of the perpendicularity of a conveyor belt idler with respect to a reference line known to be parallel to a direction of movement of a conveyor belt when the conveyor belt is disposed on the conveyor belt idler, said method comprising:
   mounting a laser, having a laser beam, to a reference axis of rotation that is parallel to a first rotational axis of a first idler roller so that the laser beam can be fixed in a chosen axial position along the reference axis of rotation, at least at times, so as to maintain the laser beam perpendicular to the reference axis of rotation whereby the laser can be moved in an arc disposed in one plane perpendicular to the reference axis of rotation while the laser is maintained at the chosen axial location along the reference axis of rotation;
   aligning the laser beam at a location on the reference line in a first rotary position of the laser beam by moving the laser axially along the reference axis of rotation; and
pivoting the laser to a second rotary position corresponding to the position of a second location at or near the reference line whereby the distance from the laser beam to the reference line at the second location is the indication of perpendicularity.

2. The method of claim 1 wherein the reference line is a second laser beam.

3. The method of claim 1 wherein the reference line is a taut wire.

4. The method of claim 1 wherein the reference line is structure on the conveyor itself.

5. The method of claim 1 wherein the reference line on a target hanging directly below an edge of the conveyor belt.

6. An apparatus for providing an indication of the perpendicularity of a conveyor belt idler with respect to a reference line known to be parallel to a direction of movement of a conveyor belt when the conveyor belt is disposed on the conveyor belt idler, said apparatus comprising:
   an idler roller attachment structure adapted to be temporarily attached to a first idler roller having a first rotational axis;
      an elongated member rotatably and axially moveably operatively attached to the idler roller attachment structure along a reference axis of rotation which is parallel to the first rotational axis; and
   a laser, having a laser beam, operatively attached to the elongated member, the laser beam being perpendicular to the reference axis of rotation.

7. The apparatus of claim 6 further comprising a lock for selectively temporarily preventing axial movement in at least one axial direction of the elongated member with respect to the idler roller attachment structure along the reference axis of rotation.

8. The apparatus of claim 7 further comprising a target hanging from an edge of the conveyor belt at the first or second location on the reference line.

9. The apparatus of claim 8 wherein the target has a weight on the top thereof to hold the target in place while it is hanging from an edge of the conveyor belt.

10. The apparatus of claim 9 wherein the target is flexible at least adjacent the weight at the top end and is heavy enough below the flexible portion to hang straight down from the edge of the conveyor belt.

11. The apparatus of claim 6 wherein the idler roller attachment structure comprises at least one magnet.

12. The apparatus of claim 6 comprising a counterbalance weight operatively attached to the elongated member for causing the laser to be not biased to a downward position by gravity due to a weight of the laser.

13. The apparatus of claim 6 wherein the conveyor belt has an edge that comprises the reference line and the laser beam is both adjustable along the reference axis of rotation and pivotable about the reference axis of rotation to align with more than one point along the edge of the conveyor belt.

14. The apparatus of claim 6 wherein the conveyor belt has an edge which comprises the reference line.

15. An apparatus for providing an indication of the perpendicularity of a conveyor belt idler with respect to a reference line known to be parallel to a direction of movement of a conveyor belt when the conveyor belt is disposed on the conveyor belt idler, said apparatus comprising:
   an idler roller attachment structure adapted to be temporarily attached to a first idler roller having a first rotational axis;
      an elongated member rotatably and axially moveably operatively attached to the idler roller attachment structure along a reference axis of rotation which is parallel to the first rotational axis; and
   a rigid linear member operatively attached to the elongated member, the rigid linear member being perpendicular to and extends to the reference axis of rotation.

16. The apparatus of claim 15 further comprising a lock for selectively temporarily preventing axial movement in at least one axial direction of the elongated member with respect to the idler roller attachment structure along the reference axis of rotation.

17. A method of using the apparatus of claim 15 for providing an indication of the perpendicularity of a conveyor belt idler with respect to a reference line known to be parallel to a direction of movement of a conveyor belt when the conveyor belt is disposed on the conveyor belt idler, said method comprising:
   mounting the rigid linear member, to a reference axis of rotation that is parallel to a first rotational axis of a first idler roller so that the rigid linear member can be fixed in a chosen axial position along the reference axis of rotation, at least at times, so as to maintain the rigid linear member perpendicular to the reference axis of rotation whereby the rigid linear member can be moved in an arc disposed in one plane perpendicular to the reference axis of rotation while the rigid linear member is maintained at the chosen axial location along the reference axis of rotation;
   aligning the rigid linear member at a location on the reference line in a first rotary position of the rigid linear member by moving the rigid linear member axially along the reference axis of rotation; and pivoting the rigid linear member to a second rotary position corresponding to the position of a second location at or near the reference line whereby the distance from the rigid linear member to the reference line at the second location is the indication of perpendicularity.

18. The apparatus of claim 15 wherein the rigid linear member is long enough to touch at least two spaced apart points along the reference line.

* * * * *